March 26, 1940. W. A. HART 2,194,595
MEANS FOR BROACHING GEARS
Filed Nov. 16, 1936 2 Sheets-Sheet 1
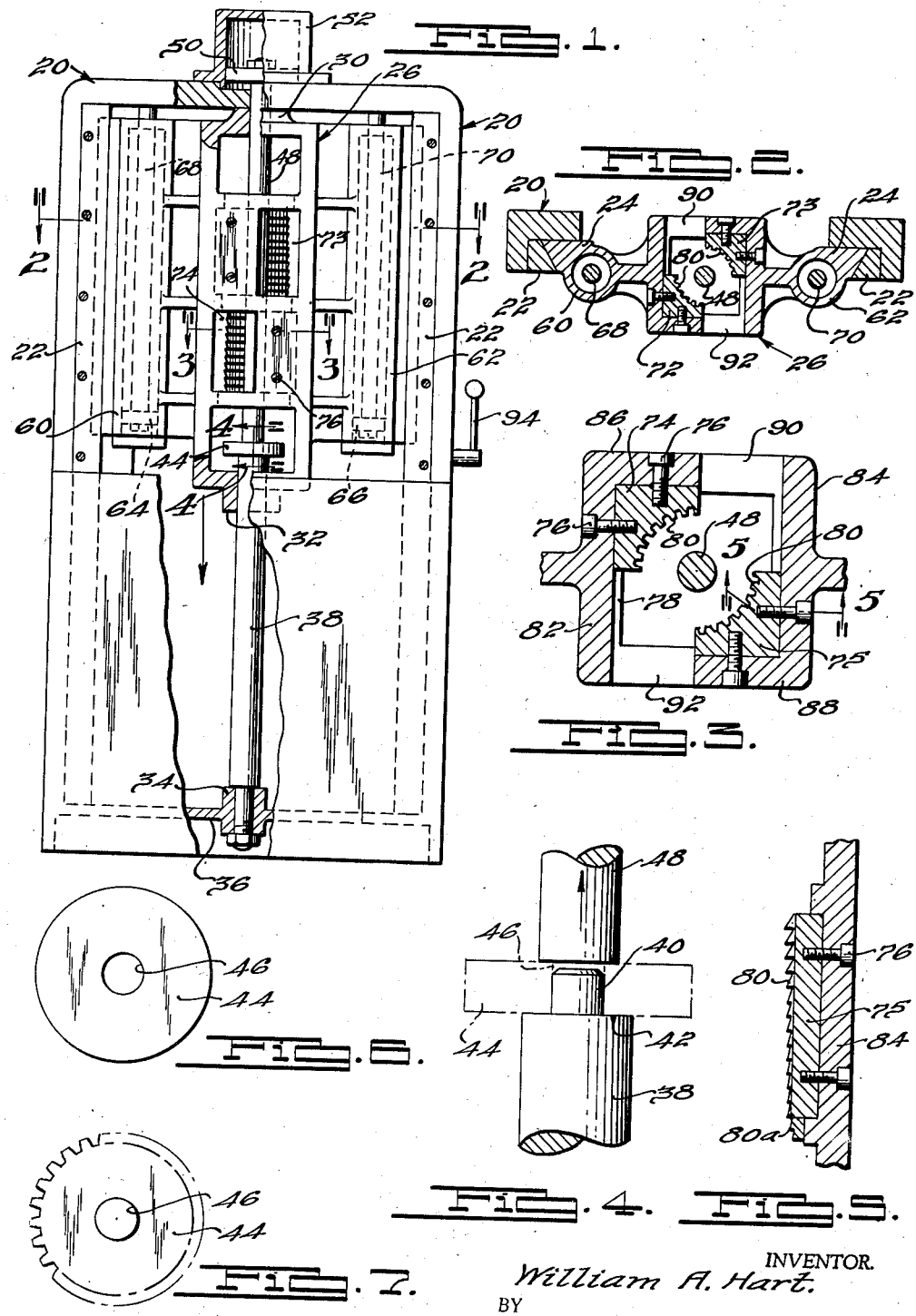
INVENTOR.
William A. Hart.
BY
Harness, Dickey, Pierce & Hann
ATTORNEYS.

March 26, 1940.  W. A. HART  2,194,595
MEANS FOR BROACHING GEARS
Filed Nov. 16, 1936  2 Sheets-Sheet 2
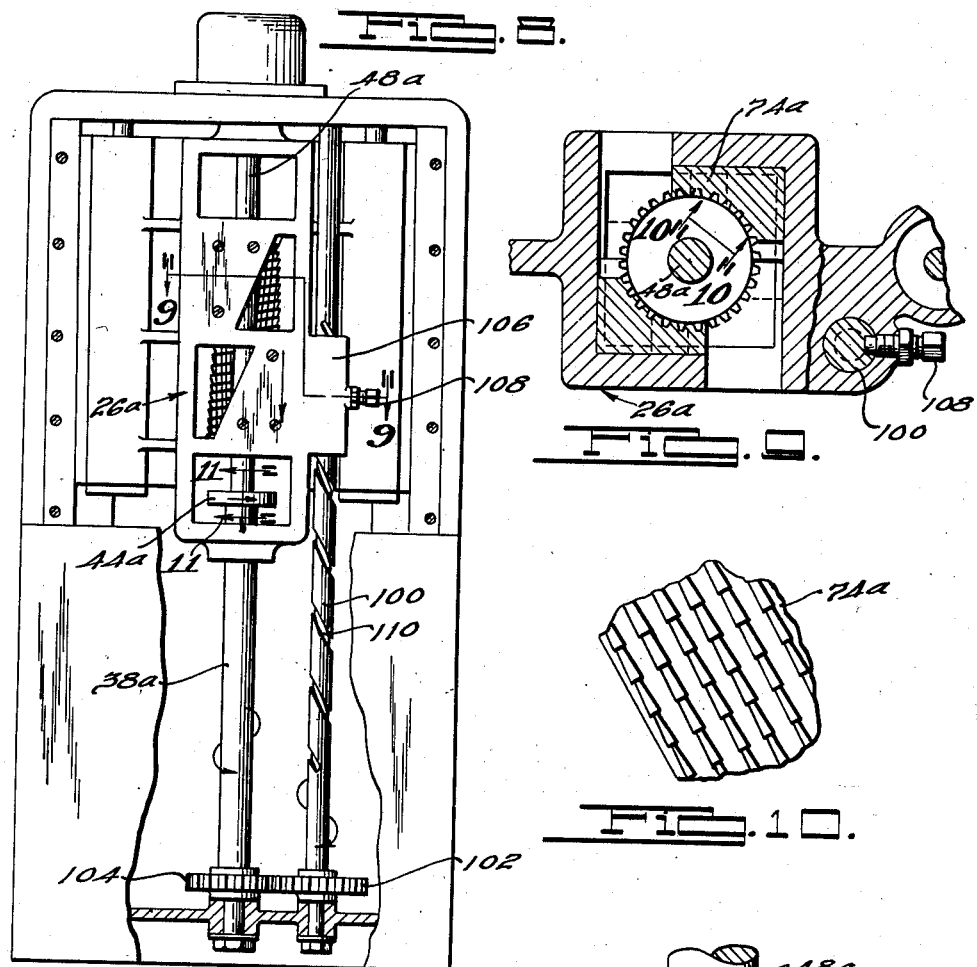
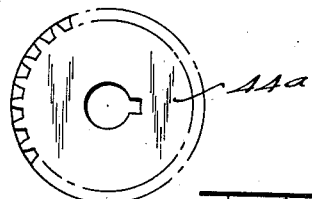
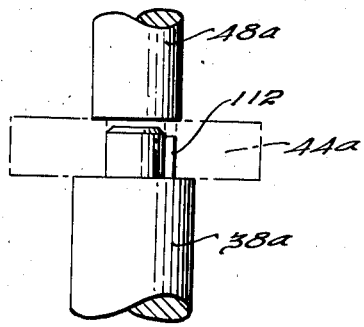
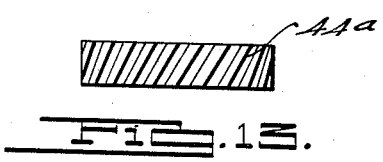
INVENTOR.
William A. Hart.
BY
Barnes, Dickey, Pierce & Hann.
ATTORNEYS.

Patented Mar. 26, 1940

2,194,595

UNITED STATES PATENT OFFICE 2,194,595

MEANS FOR BROACHING GEARS

William A. Hart, Detroit, Mich., assignor to Colonial Broach Company, Detroit, Mich., a corporation of Michigan Application November 16, 1936, Serial No. 111,000

7 Claims. (Cl. 90—8)

The present invention relates to broaching methods and mechanisms, and in particular provides an improved method, tool, and machine for broaching external gears.

It has been proposed heretofore to broach external gears utilizing a ring type or circular broach having broach teeth formed of the inner circumference thereof. This method of broaching external gears, however, has not been widely used in view of the difficulty and expense of forming the ring type internal broaches. This difficulty is due, as will be appreciated, to the fact that the relation between the length and inside diameter of the ring type broach may be such that it is difficult if not impossible to introduce a forming or tooth sharpening tool into the interior of the broach.

In accordance with the present invention, the above difficulty, as well as others, are effectively overcome by forming the broaching tool as a series of segmental elements. Since each tool element comprises only a segment of a complete circle, access is readily afforded to the broach teeth for purposes of initially forming the teeth as well as for purposes of sharpening the teeth. Relatively long broaches, and broaches adapted for the broaching of gears of relatively small diameters, may therefore be readily and economically manufactured and resharpened.

In further accordance with the present invention, it is preferred to distribute the individual segmental broach elements along the machine. In order to equalize the working stresses, the tool elements are preferably arranged in spaced pairs, the individual elements of each pair being disposed in diametrically opposed relation. The disposition of the broach elements in spaced pairs, in addition to reducing the power requirements of the broaching machine, also effectively overcomes the difficulties heretofore encountered due to the congestion of chips within the broach body. In the present arrangement, by spacing the pairs of broaches, openings are afforded for the discharge of chips.

With the foregoing considerations, as well as others, in view, objects of the present invention are to provide an improved method, tool, and machine for broaching gears, the method being one which may be readily and rapidly practiced, and the tool and machine being ones which may be economically manufactured, assembled, operated, and maintained.

Further objects of the present invention are to provide a method of broaching gears, in accordance with which a complete gear may be broached in a single pass of a gear blank relative to a series of angularly offset broaching tool elements; to provide such a method in which a plurality of broaching tool elements are arranged in pairs, the elements of each pair being in diametrically opposed relation and the successive pairs being in angularly offset relation; to provide such a method in accordance with which a complete gear may be broached from a blank in a single pass of the blank relative to the series of broaching tool elements; and to provide such a method in accordance with which the gear blank and tool elements may be rotated relative to each other during the pass in order to provide for the broaching of helical gears.

Further objects of the present invention are to provide a tool for broaching gears, embodying a series of segmental broaching tool elements; which may be arranged in pairs, the tool elements of each pair being in diametrically opposed relation and the successive pairs being disposed in angularly offset and axially spaced relation to each other; to provide a broaching machine in accordance with which the blanks to be broached may be stationarily supported and a tool, formed of the series of tool elements, may be moved past the blank to broach the complete blank in a single pass; to provide such a machine in which the blank to be broached may be stationarily held by column members which also act as guides for the broaching tool, to insure accurate centering of the blank relative to the broaching tool; and to provide such a machine embodying means for rotating the blank relative to the broaching tool in order to provide for the broaching of helical gears.

With the above and other objects in view, which appear in the following description and in the appended claims, preferred but illustrative embodiments of the invention are shown in the accompanying drawings, throughout which corresponding reference characters are used to designate corresponding parts and in which:

Figure 1 is a general view in elevation, partly in section, of a broaching machine embodying the invention;

Fig. 2 is a view in horizontal section taken along the line 2—2 of Fig. 1;

Fig. 3 is a view in horizontal section, taken along the line 3—3 of Fig. 1;

Fig. 4 is a view in vertical section, taken along the line 4—4 of Fig. 1;

Fig. 5 is a view in vertical section, taken along the line 5—5 of Fig. 3;

Fig. 6 is a view in plan of a gear blank illustrative of the type which may be broached in the present machine;

Fig. 7 is a view of a gear illustrative of one of the various tooth forms which may be produced in the practice of the invention;

Fig. 8 is a general view in elevation, of an embodiment of the invention arranged for the broaching of helical gears;

Fig. 9 is a view in horizontal section, taken along the line 9—9 of Fig. 8;

Fig. 10 is a fragmentary view taken along the line 10—10 of Fig. 9;

Fig. 11 is a fragmentary view in vertical section, taken along the line 11—11 of Fig. 8; and Figs. 12 and 13 are views in plan and in elevation respectively of a helical gear of a form which may be broached in the practice of the invention.

Referring first to the embodiment of Figs. 1 through 5, the machine may comprise generally a base structure 20, the forward face of which, with the removable plates 22, forms ways to receive the guide portions 24 of a tool holder or supporting cross head structure designated as a whole as 26. The tool holder 26 is disposed to be reciprocated between the upper limit position shown in Fig. 1, in which the collar 30 at the upper end thereof abuts or is adjacent the upper end of the frame, and a lower position, in which the collar 32 at the lower end thereof abuts or is adjacent a stop 34 carried by a web 36 which may form a part of the base of the frame 20. The cross head 26 is guided in the reciprocating movements by the previously mentioned ways, and also by a work-supporting column 38, the lower end of which is secured within the portion 34, and the upper end of which is formed to define a pilot 40 and a seat 42. The illustrative gear blank 44 is provided with an axial bore 46, within which the pilot 40 accurately fits, and rests upon the seat or shoulder 42 formed at the upper end of the column 38. The column 38 thus forms the dual function of supplementing the guiding of the tool carrier 26, and of affording a support for the gear blank 44.

During a broaching operation, the gear blank 44 is maintained in firm seating relation to the shoulder 42 by a supplemental column 48 which extends upwardly through the machine through a guide passage provided therefor in the upper portion of the frame, and through a suitable bore provided therefor in the upper end of the tool holder 26. A piston 50 is connected to the upper end of the column 48, and is disposed for limited reciprocation within a chamber 52, suitably secured to the frame 20. The supplemental column 48 is shown in Figs. 1 and 4 in its lowered or work-engaging position, and it will be appreciated that the introduction of fluid pressure to the under side of piston 50 causes column 48 to move upwardly relative to the gear blank 44, thereby permitting blank 44 to be removed from the supporting column 38 and a new gear blank substituted therefor. As a preliminary to a broaching operation, fluid pressure is introduced to the upper side of piston 50, forcing column 48 to the work-engaging position shown in Figs. 1 and 4.

The up and down movements of the tool holder 26 are preferably effected by the use of fluid pressure, which fluid pressure may be applied thereto in any of a variety of ways, in accordance with the broader aspects of the invention. As illustrated, two fluid pressure rams 60 and 62 are formed at the respectively opposite sides of the tool holder 26, and accommodate pistons 64 and 66, respectively, which are secured to stationary piston rods 68 and 70. The detailed construction of the rams 60 and 62 forms no part of the present invention and has not been illustrated in detail, but preferably follows the disclosure of applicant's copending application, Serial No. 42,619, filed September 28, 1935, and assigned to the same assignee as the present application. It will be appreciated that the introduction of fluid pressure into the rams below the associated pistons causes the tool holder 26 to move downwardly, and that the application of fluid pressure to the chamber portions above the pistons causes the tool holder 26 to move upwardly.

The tool holder 26 is illustrated as comprising a generally rectangular body, the inner faces of the walls of which are accurately formed to receive a plurality of pairs of segmental broaching tool elements, the individual tools of each pair being disposed in diametrically opposed relation to each other and the respective pairs being disposed in angularly offset and axially spaced relation to each other. In the illustrated instance, each tool element is formed to cover substantially 90 degrees of the circumference of a gear blank and, as a consequence, a tool of four elements, or two pairs of elements, is effective to complete the broaching operation.

The upper pair of broaching tool elements shown in detail in Fig. 2, are designated 72 and 73, and the lower pair of broaching tool elements are designated 74 and 75. The back portion of each broaching tool element is accurately formed as a right angle, to fit into the associated corner of the tool holder, in which position it may be secured, for example, by the counter-sunk studs 76. Preferably, and as illustrated, the respective tool elements are positively retained against axial movement relative to the tool holder by the provision of supporting shoulders such as 78 therefor in the carriage 26, one shoulder 78 being provided in supporting relation to one end of a tool and a similar shoulder 78 being disposed in supporting relation to the other end of the particular tool. As will be appreciated, the teeth 80 of all of the broaches 72, 73, 74, and 75 are formed in accordance with the particular form it is desired to produce upon the gear blank 44, and the individual broach teeth are formed of progressively increasing depth from the lower end of the broach to the upper end thereof. Preferably also, in order to render the broaching elements effective to reduce the periphery of the gear blank to correct concentric relation to the axis of the blank, the leading end of each broach element is provided with one or more continuous teeth 80a. This relation is clearly shown in Fig. 5. It will be appreciated that the individual broaching elements 72 through 75 may be relatively easily formed and re-sharpened as the need arises, since the teeth thereof are readily accessible.

The carriage 26 may be economically formed as a casting and, to simplify manufacture, the walls 82 and 84 thereof are continuous. The remaining wall portions, such as 86 and 88, are cut away to form entries 90 and 92, by which access may be gained to the interior of the carriage to permit free chip removal.

In the operation as a whole of the machine of Figs. 1 through 5, it will be appreciated that the parts are shown in Fig. 1 in readiness for a broaching operation, with an uncut gear blank 44 in clamped relation between the columns 38 and 48. The gear blank 48 may take the initial form shown in Fig. 6, in which the axial bore 46 is approximately located relative to the circumference of the blank.

With the parts in the position shown in Fig. 1, a broaching operation may be initiated by actuating suitable valve mechanism (not shown) but which may readily be arranged in a well known manner to respond to operation of the control lever 94, to introduce fluid under pressure to the undersides of the pistons 64 and 66, which action forces the tool holder 26 in the downward direction. During the course of its downward movement, the lower pair of broaching tools 74 and 75 are progressively moved past the periphery of the gear blank 44, and form gear teeth throughout portions of the periphery of the blank corresponding to the angular position of the two tools 74 and 75. The initial teeth 80a of the tool elements 74 and 75 reduce the corresponding portions of the circumference to accurately concentric relation to the axial bore 46, and the remaining teeth thereof progressively form the gear teeth. Due to the diametrically opposed relation of the two tools 74 and 75, the forces acting on the gear blank 44, due to the broaching action, are balanced, and no substantial forces exist tending to alter the correct axial relation between the blank and the tool holder.

Following the passage past the blank of the tools 74 and 75, the remaining pair of diametrically opposed tools 72 and 73 are moved past the blank and reduce the remaining circumferential portions to correct concentric relation to the bore 46, and also form teeth in the remaining portions of the circumference thereof in the manner just described with reference to tool 74 and tool 75.

It is generally found satisfactory to arrange the respective tools so that they cover a segmental angle of 90 degrees, without overlapping each other. In certain instances, however, in order to positively prevent the formation of beads at the lines of intersection between the areas cut by the respective tools, it is found desirable to form each tool to cover an angle slightly in excess of 90 degrees, thus introducing a slight overlap between the areas machined by the respective tools.

In the embodiment of the invention shown in Figs. 8 through 11, the machine is arranged to broach helical gears. In accomplishing this, the spur type broaching tool elements described with reference to the first embodiment are replaced by tool elements which correspond thereto in all respects with the exception that the teeth thereof (Fig. 10) are disposed along a helix angle, determined of course in accordance with the desired helix angle of the gear. The mounting of the respective tool elements within the tool holder 26a corresponds in all respects to the previously described arrangement. In addition, means are incorporated into the machine to effect axial rotative movement of the gear blank relative to the tool holder in timed relation to the broaching movement of the tool holder. As illustrated, this means comprises a lead screw 100, suitably rotatably journaled between the upper and lower ends of the frame and provided with a spur gear 102, which is disposed in continuously meshing and driving relation to a spur gear 104. The spur gear 104 is carried by the supporting column 38a, which corresponds to the previously described column 38.

In order to cause the lead screw 100 to rotate in timed relation to the advance of the tool holder 26a, the latter member is provided with a driving collar 106, within which the lead screw 100 is slidably received. A finger 108 projects through the wall of the collar 106 and enters the groove 110 formed in the lead screw. As the carriage 26a is moved, accordingly, the finger 108 riding in the groove 110 causes an axial rotation of the lead screw 100. This axial rotation is transmitted through gears 102 and 104 to the supporting column 38a. In order to maintain the gear blank 44a rotation in accurately timed relation to the rotation of the supporting column, the blank 44a is preferably secured, as by a key 112 (Fig. 11), to the supporting column 38a.

In operation, the gear blank 44a is held in seating relation to column 38a by the supplemental member 48a which corresponds to the previously described member 48. As the tool holder 26a moves downwardly from the starting position shown in Figure 8, gear blank 44a is given a rotative movement in timed relation to the tool movement. As will be appreciated, accordingly, the passage past the blank 44a of the lower pair of tools 74a and 75a, in addition to reducing the peripheral portion to correct concentric relation, also cuts helically disposed teeth in two diametrically opposed segmental areas, each area covering substantially 90 angular degrees. Similarly, as the upper pair of broach elements are moved past the gear blank 44a, helical teeth are cut in the remaining segmental areas of the circumference of the blank, thus completing the gear.

In view of the fact that the rectilinear movement of the broach element is accompanied by rotative movement of the gear blank, and in view of the fact that the successive pairs of broach elements are axially displaced relative to each other, it will be appreciated that the angular spacing between successive pairs of broach elements, instead of being 90° as in the first described embodiment, is 90° plus or minus the angle of rotative advance which is given to the gear blank 44a between the time the first pair of broach elements engage the blank and the time the first teeth of the following pair of broach elements engage the blank. This relation is clearly indicated in Fig. 9, in which, in dotted lines, the broach elements 72a and 73a of the upper pair are superimposed upon the broach elements 74a and 75a of the lower pair. In all other respects, the construction and operation of the tools and machine of Figs. 8 through 11 duplicate the construction and arrangement of the tools and machine of Figs. 1 through 5.

Although specific embodiments of the invention have been described, it will be appreciated that various modifications may be made in the form number and arrangement of parts of the tools and machine, and that various alterations and changes may be made in the practice of the improved method, within the spirit and scope of the present invention.

What I claim is:

1. In a broaching machine for broaching the periphery of a work piece, the combination of a broach formed of a plurality of segmental elements, each effective to broach only a portion of said periphery, and a tool holder for said broach element effective to support said broach elements in axially spaced and angularly offset relation.

2. In a broaching machine for broaching the periphery of a work piece, a broach comprising a plurality of segmental elements, each effective to broach only a portion of said periphery, and a tool holder for said broaching elements effective to support said elements in axially spaced pairs, the elements of each pair being disposed in diametrically opposed relation and the successive pairs being disposed in axially spaced relation.

3. In a broaching machine for broaching the periphery of a work piece and embodying a broach formed of a plurality of segmental broaching elements, each effective to broach only a portion of said periphery, a carriage for supporting said elements including a longitudinally extending generally rectangular body, adjacent walls of said walls forming seats for said broach elements, and means defining longitudinally spaced shoulders within said body disposed to support the ends of said broach elements and retain said broach elements in axially spaced and angularly offset relation.

4. A machine for broaching the periphery of a work piece comprising a plurality of segmental broaching tool elements, means supporting said tool elements in axially spaced pairs with the individual tool elements of each pair in diametrically opposed relation and with the tools of said successive pairs in angularly offset relation, and means for effecting relative movement of said work piece past said successive pairs of broaching tool elements so that the successive elements broach corresponding angularly spaced areas of said periphery.

5. A machine for broaching external gear blanks comprising a plurality of pairs of segmental broaching tool elements, means supporting said pairs in axially spaced and angularly offset relation, with the elements of each pair in diametrically opposed relation, and means for effecting relative movement of said gear blank past said successive pairs of broaching tool elements so that the successive elements broach corresponding angularly spaced areas of the blank.

6. A machine for broaching helical external gear blanks comprising a plurality of pairs of segmental broaching elements, means supporting said pairs in axially spaced and angularly offset relation, with the elements of each pair in diametrically opposed relation, means for effecting relative movement of said blank past said successive pairs of elements so that the successive elements broach corresponding angularly spaced areas of the blank, and means for effecting axial rotation of said blank relative to said elements during said passage.

7. A machine for performing a broaching operation upon the periphery of a body comprising a plurality of segmental broaching tool elements, means supporting said broaching tool elements in spaced relation along the line of movement between the body and the tool elements and in angularly offset relation in a plane transverse to said line, and means for effecting relative movement between said work piece and said successive tool elements along said line, so that the successive elements broach corresponding angularly spaced areas of said periphery.

WILLIAM A. HART.